United States Patent [19]
Frank et al.

[11] Patent Number: 5,317,763
[45] Date of Patent: Jun. 7, 1994

[54] APPARATUS FOR LOW NOISE FLUSHING A VACUUM TOILET, ESPECIALLY IN AN AIRCRAFT

[75] Inventors: Helge Frank; Christian Sparr, both of Hamburg, Fed. Rep. of Germany

[73] Assignee: Deutsche Aerospace Airbus GmbH, Hamburg, Fed. Rep. of Germany

[21] Appl. No.: 8,676

[22] Filed: Jan. 25, 1993

[30] Foreign Application Priority Data

Jan. 25, 1992 [DE] Fed. Rep. of Germany ....... 4201986

[51] Int. Cl.⁵ .............................................. E03D 9/14
[52] U.S. Cl. .......................................... 4/434; 4/435; 4/438
[58] Field of Search ................... 4/434, 435, 436, 437, 4/438, 439, 440, 441, 442, 316

[56] References Cited

U.S. PATENT DOCUMENTS

| | | | |
|---|---|---|---|
| 4,297,751 | 11/1981 | Olin et al. | 4/434 |
| 4,783,859 | 11/1988 | Rozenblatt | 4/434 |
| 5,007,117 | 4/1991 | Oldfelt et al. | 4/435 |
| 5,165,457 | 11/1992 | Olin et al. | 4/438 |

FOREIGN PATENT DOCUMENTS 3026763 2/1981 Fed. Rep. of Germany .
3932893 4/1990 Fed. Rep. of Germany .......... 4/434

OTHER PUBLICATIONS

Article: "Schallschutz bei der Sanitaerinstallation", Heft 6, 1991 IKZ-Haustechnik, pp. 54,57,58,60.

*Primary Examiner*—Henry J. Recla
*Assistant Examiner*—Charles R. Eloshway
*Attorney, Agent, or Firm*—W. G. Fasse; W. F. Fasse

[57] ABSTRACT

The noise developed in a suction toilet system, for example in an aircraft, by the activation of a suction valve is substantially reduced by generating the required suction with the aid of two valves, one of which is a by-pass flow valve that can be arranged away from the toilet bowl itself. The air supply for the by-pass flow valve is provided through a noise damper, whereby a substantial reduction in the noise is achieved. The by-pass flow valve is connected to the conduit that connects the bowl to the collecting container with a T-coupling near the container.

10 Claims, 7 Drawing Sheets

APPARATUS FOR LOW NOISE FLUSHING A VACUUM TOILET, ESPECIALLY IN AN AIRCRAFT

FIELD OF THE INVENTION

The invention relates to an apparatus for flushing a vacuum toilet, especially in aircraft. Such toilets have a trigger mechanism such as a push button to be operated by the user. A flushing water valve and a suction valve are part of the conventional equipment. The suction valve is located in a conduit between the toilet bowl and a collecting container.

BACKGROUND INFORMATION

When such conventional vacuum toilets are operated, the flushing is started by operating the trigger mechanism. As a result, flushing liquid, such as water is supplied, and thereafter the suction valve is opened for flushing the waste out of the toilet bowl and into the collection container. The transport of the waste is accomplished by a pressure difference between the collecting container and the toilet bowl. As a result, a rush of air is generated which in turn produces substantial noise and such noise is even amplified by the funnel effect of the toilet bowl. It is desirable to avoid or at least diminish such noise generation or to damp its effect.

OBJECTS OF THE INVENTION

In view of the foregoing it is the aim of the invention to achieve the following objects singly or in combination:

to avoid or at least substantially diminish the noise generation or emission when a vacuum toilet is being flushed;

to assure in spite of substantially reducing or avoiding the noise emission, a sufficient cleaning function so that the waste is properly transported into the collecting container without clogging the conduit;

to employ at least one noise damper in a vacuum-type toilet system; and to arrange the toilet system components in a space saving compact manner, especially for installation in an aircraft.

SUMMARY OF THE INVENTION

The above objects have been achieved according to the invention by the combination of the following features. The suction valve is arranged in the conduit between the toilet bowl and the collecting container at the conduit end near the toilet bowl. Further, a coupling device, such as a plumming T-connector, is arranged in the conduit preferably near the collecting container and a by-pass flow valve is connected to the T-connector.

This type of arrangement according to the invention makes it possible to divide the total air requirement into two portions. The first, smaller portion is provided for the emptying of the toilet bowl, while the second larger portion is provided for transporting the waste through the conduit from the bowl into the collecting container. The air proportion needed for the transport is supplied through the by-pass flow valve connected to the T-connector. This combination of features greatly reduces or even eliminates the noise amplifying funneling effect of the toilet bowl during a substantial time duration while the flushing of the toilet takes place. Further, it is possible according to the invention to suitably arrange the air supply for the by-pass flow valve so that any noise emission generated by the by-pass flow valve is hardly audible.

Preferably, a computerised FLUSH control unit (FCU) is provided for coordinating the sequence of the operation of the rinsing and suction operations in that first the suction valve is activated and thereafter with a suitable time delay the by-pass flow valve is switched on by the computerized FLUSH control unit.

The noise emission duration is further minimized while a sufficient cleaning function is assured in that the suction valve is switched on for only about one second, while the by-pass flow valve is switched on only for about three seconds.

The noise emission may further be reduced in that the by-pass flow valve is connected to a state of the art noise damper so constructed that it provides the air needed for transporting the waste from the bowl to the collecting container through the conduit.

In order to avoid any back flow through the by-pass flow valve to the noise damper, it is preferred to arrange a one-way flow device between the noise damper and the by-pass flow valve. However, the use of a one-way flow device or controller may be avoided by arranging the noise damper at a level which by itself prevents any liquid back flow into the noise damper functioning as an air intake.

The noise emission may be further reduced by arranging the by-pass flow valve below the floor on which the toilet bowl is installed. This feature has the added advantage that the available space around the toilet bowl is not needed for the installation of the by-pass flow valve. However, in those instances where there is little space below the floor, such as in smaller aircraft, it is possible to install the by-pass flow valve above or on the floor on which the toilet is installed. Similar considerations apply to the noise damper which is preferably installed below the floor of the toilet if possible for a further noise reduction. If such installation is not possible, a quite satisfactory noise reduction is achieved by installing the noise damper above or on the installation floor of the toilet.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
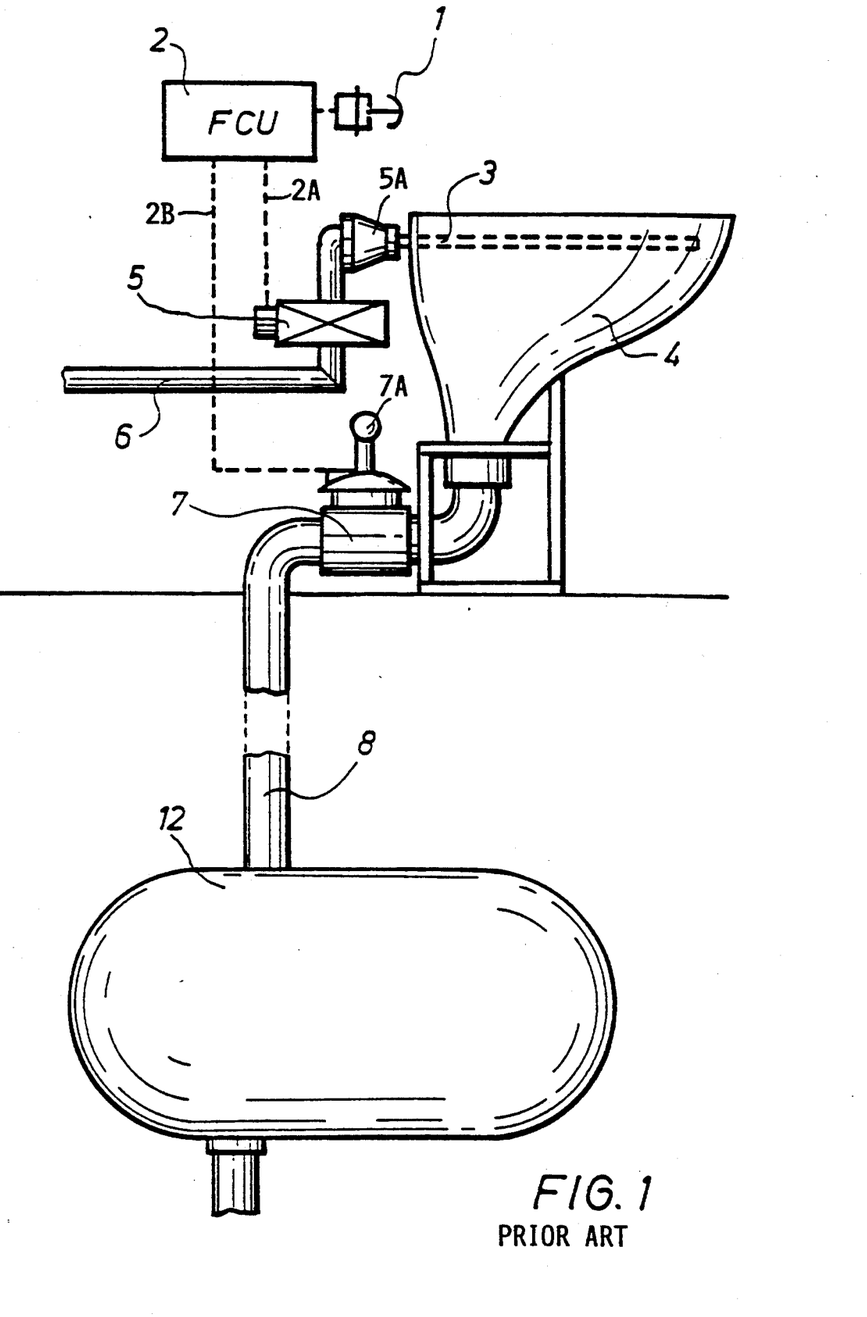
FIG. 1 is a schematic illustration of a conventional vacuum flushing toilet system.
Figure 6:
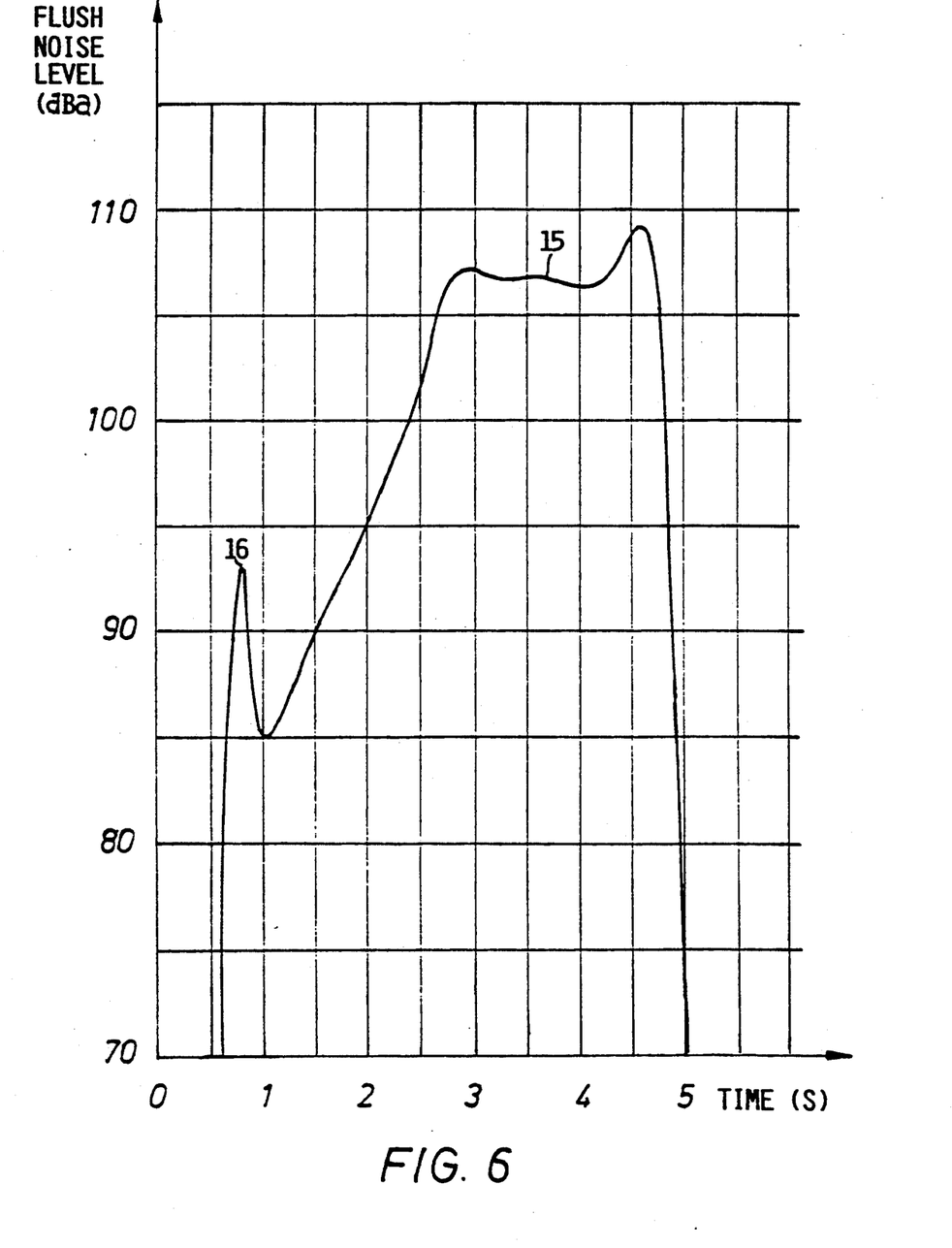
FIG. 6 shows a noise level curve as a function of time for the conventional toilet installation of FIG. 1.

FIG. 1 shows a toilet bowl 4 equipped with a flushing ring 3 connected to a flushing liquid supply container, not shown, through a pipe 6. A flush water valve 5 is connected to the pipe 6 close to the toilet bowl 4. A water distributor coupling 5A connects the pipe 6 to the flushing ring 3. A computerized FLUSH control unit (FCU) 2 controls the operation of the valve 5 through an electrical control conductor 2A. A further control conductor 2B leads to a suction valve 7 driven by a motor 7A. The suction valve 7 is connected in a waste conduit 8 connecting the bowl 4 to an evacuated collection tank or container 12. The control unit 2 is operated by a trigger device 1 such as a pressure generating push button 1. The just described conventional system has a noise characteristic as shown in FIG. 6 to be described in more detail below.

Figure 2:
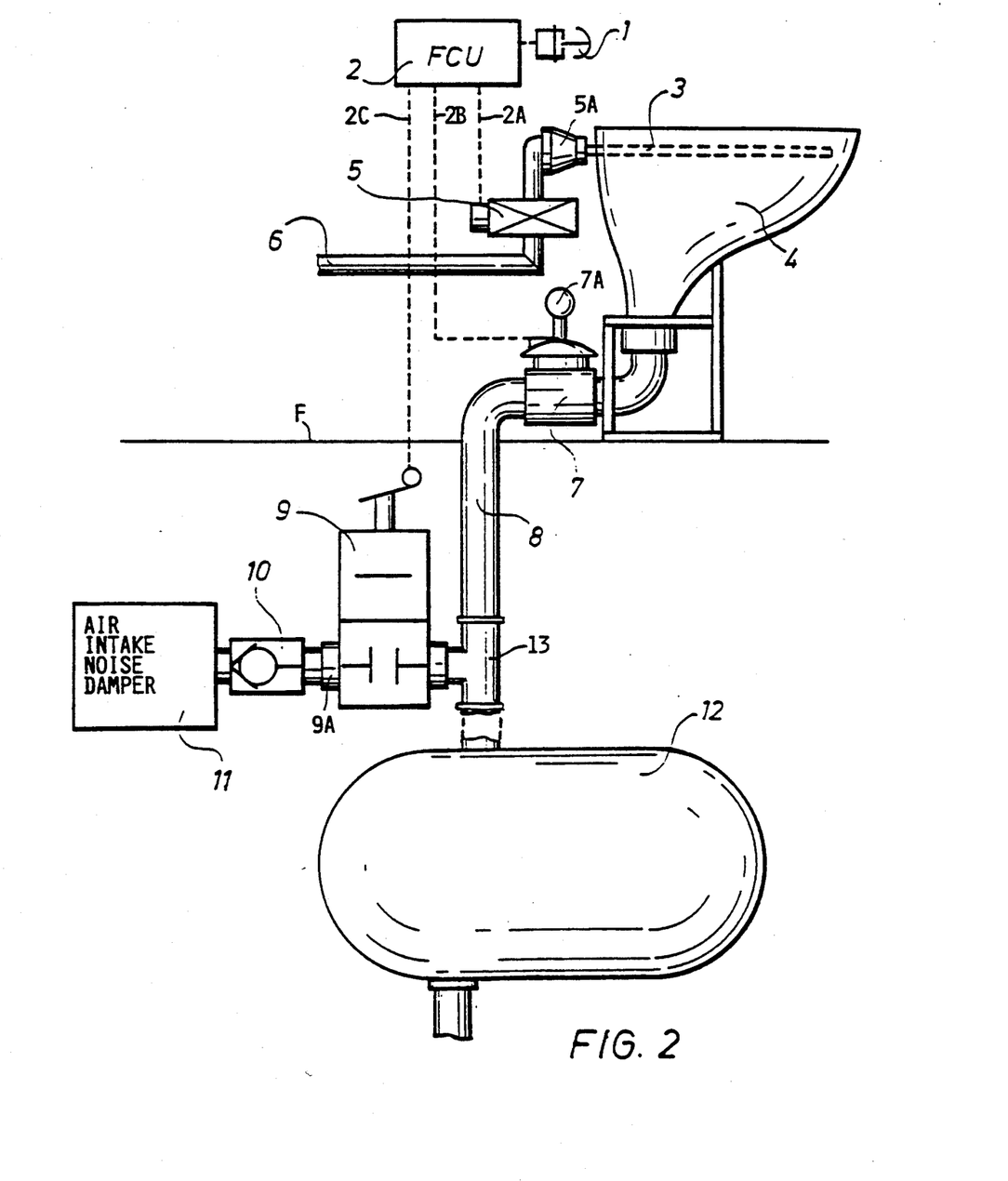
FIG. 2 is a similar schematic illustration of a toilet system according to the invention, equipped with a T-connector and a by-pass flow valve installed below the toilet floor.

FIG. 2 shows a first embodiment according to the invention whereby the components already shown in FIG. 1 are provided with the same reference characters. According to the invention, a coupling 13, such as a plumbing T-connector, is provided in the waste discharge conduit 8, preferably close to the collection tank 12. A by-pass flow valve 9 is connected to the T-connector 13 and controlled in its operation by the FCU 2 through an electrical control conductor 2C. All valves 5, 7, and 9 are electromagnetically operable and have a solenoid for this purpose.

The by-pass flow valve 9 feeds the air volume necessary for transporting the waste through the conduit 8 into the collecting tank 12. One port 9A of the by-pass flow valve 9 is connected to a noise damping device 11 through a one-way flow control device or controller 10. The noise damping device 11 functions as an air intake for the valve 9. Thus, due to the one-way flow controller 10, the air can flow through the noise damper 11 into the valve 9 and from there through the T-connector 13 and the conduit 8 into the container 12, but fluid cannot flow in the opposite direction. All the components 9, 10,11,12, and 13 are installed in this embodiment below the floor F of the toilet.

Figure 3:
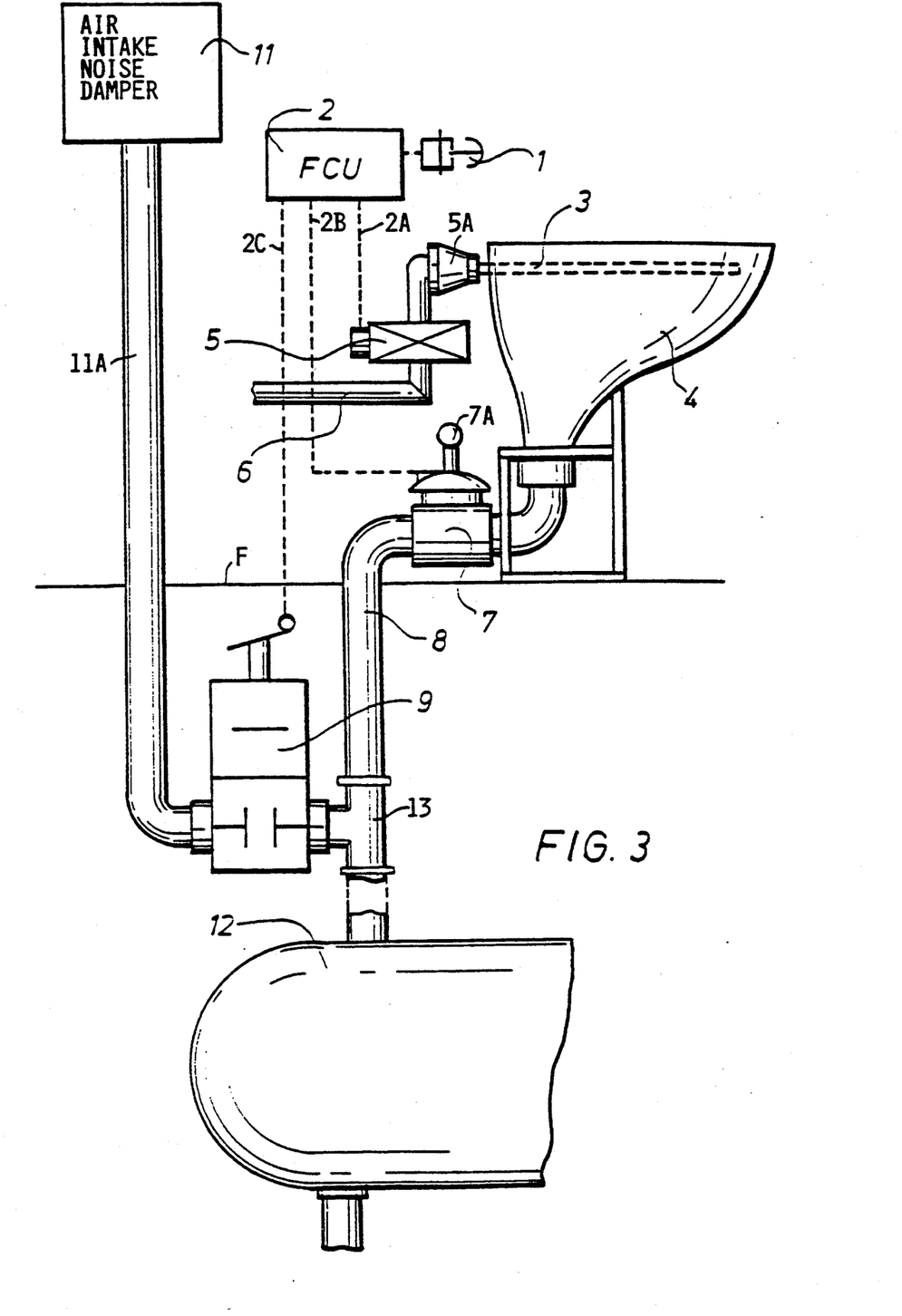
FIG. 3 is a view similar to that of FIG. 2, however illustrating the installation of the by-pass flow valve below the toilet floor and the noise damper above the toilet floor.

FIG. 3 shows an embodiment in which the air intake and the noise damper 11 is installed above the floor F and connected to the valve 9 through a conduit 11A. The air intake and noise damper 11 is positioned at such a level that the one-way flow controller 10 of FIG. 2 is not necessary in FIG. 3. The damper 11 is positioned at a level above the maximum filling level of the toilet bowl 4.

Figure 4:
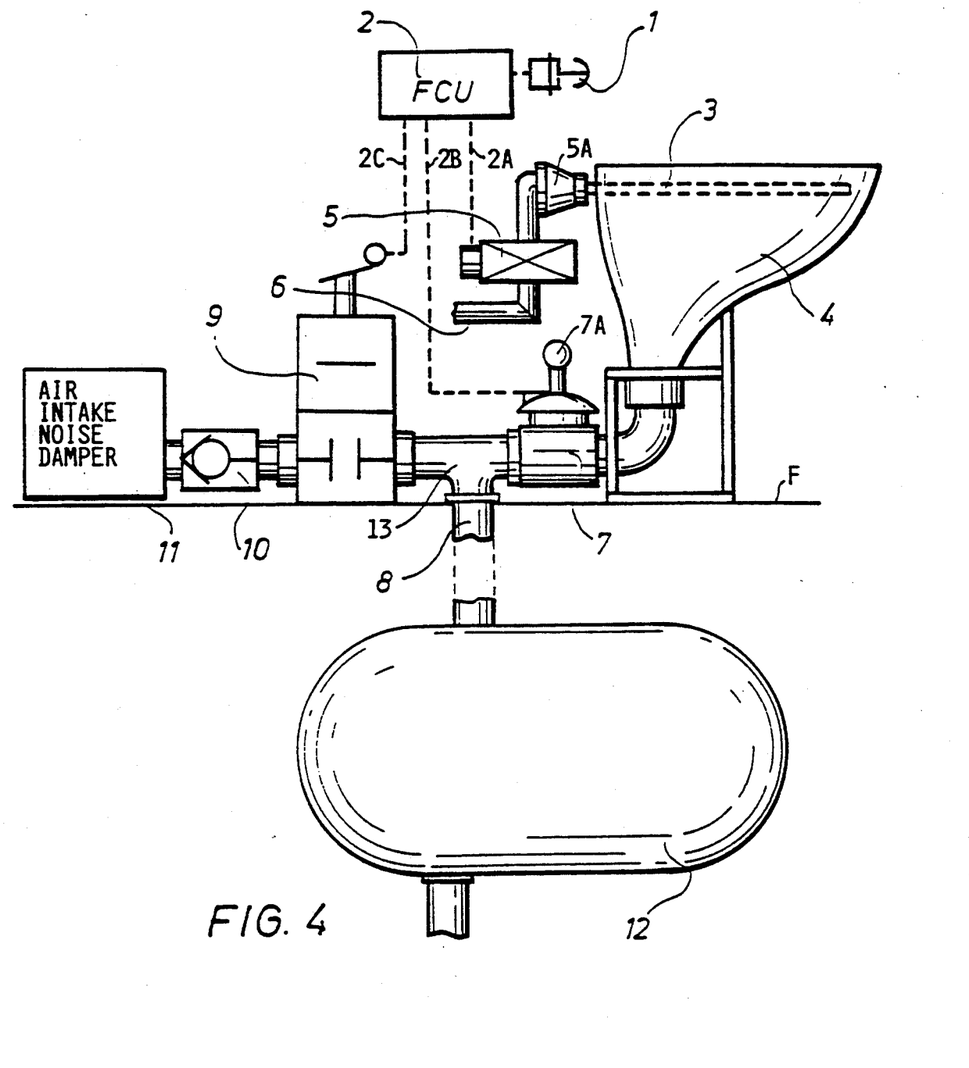
FIG. 4 illustrates an installation of the by-pass flow valve and the noise damper above the toilet floor.

In FIG. 4 all the components 9, 10, and 11 including the T-connector 13 are installed above the floor F. Only the collecting container 12 remains below the floor F. However, the air intake and noise damper 11 is located at such a level below the level of liquid that can collect in the bowl 4 that a one-way flow controller 10 is preferred between the intake 11 and the valve 9.

Figure 5:
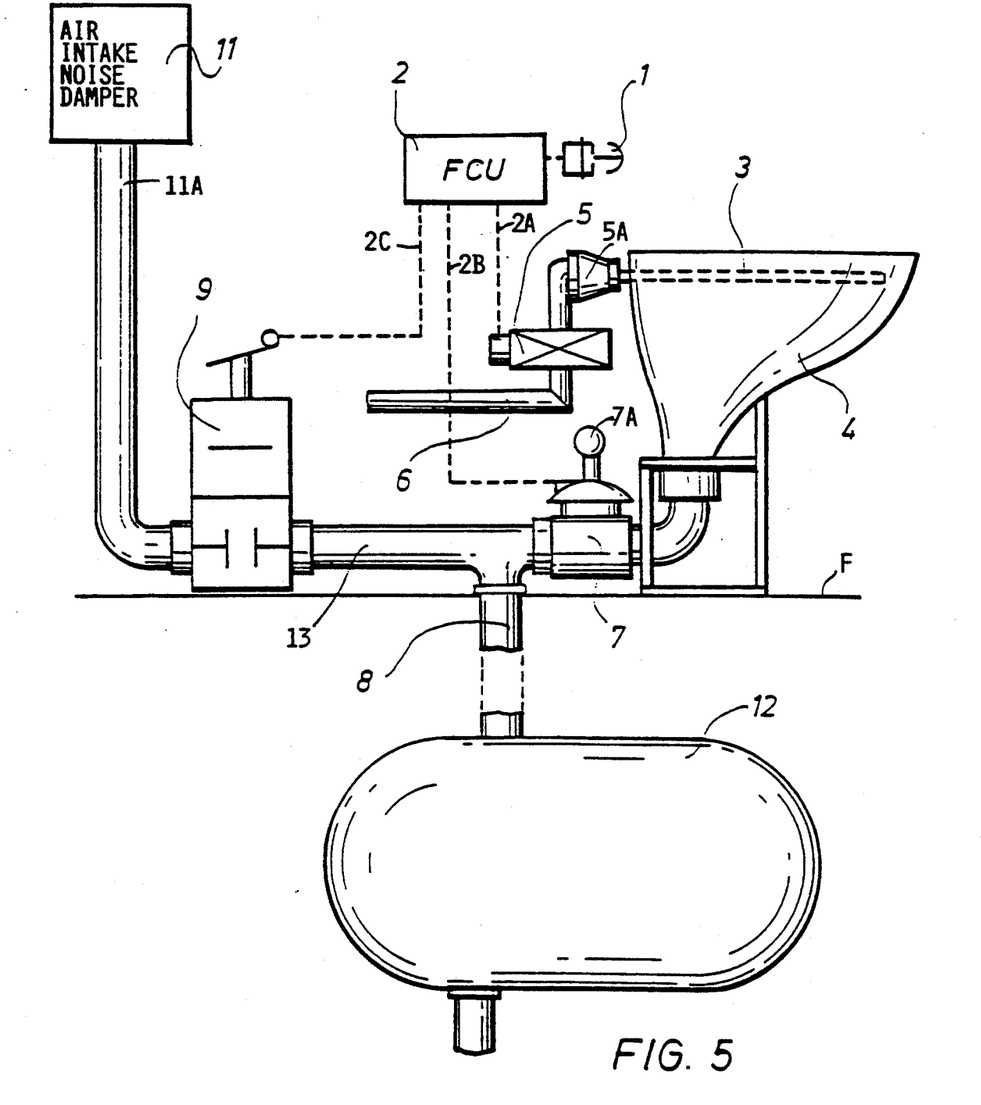
FIG. 5 is a view similar to that of FIG. 4, however, illustrating the installation of the noise damper at a level not requiring a one-way flow controller.

FIG. 5 shows an embodiment where again the by-pass flow valve 9 and the T-coupling 13, as well as the noise damper 11 are mounted above the floor F. However, the intake and noise damper 11 is positioned at a level above the maximum liquid level in the toilet bowl 4, whereby a one-way flow controller in the conduit 10A is avoided.

In operation, when the toilet has been used, the user pushes the push button of the triggering device 1 to activate the FLUSH control unit 2. The FLUSH control unit comprises timers for the activation of the flushing water valve 5 and then the suction valve 7 as well as the by-pass flow valve 9 through the respective conductors 2A, 2B, and 2C. As stated, the valves are electromagnetically operated valves. First, the flushing water valve 5 is opened for about one half of a second, whereby just sufficient water is supplied into the bowl 4 to transport the waste out of the toilet bowl 4 with the aid of gravity toward the suction valve 7. At this point the suction valve 7 is activated for about one second, whereby a pressure difference is generated between the toilet bowl 4 and the collecting container 12 through the conduit 8. Thus, initially the waste is transported into the conduit 8. According to the invention the suction valve 7 is now closed and the by-pass valve 9 is energized, whereby an air flow from the valve 7 into the container 12 is generated, since the by-pass flow valve 9 is connected through the T-connector 13 to the duct 8 near the container 12. As a result, the waste is fully transported into the container 12. Experience shows that about three seconds time duration is required for this transport. Thus, the valve 9 is open for this time duration and the valve 7 is closed while the valve 9 is open so that the noise emission from the valve 7 hardly reaches the toilet bowl where it could be amplified. The invention avoids this problem. The air supply to the by-pass valve 9 takes place through the air intake and noise damper 11 so that a noise emission is substantially reduced.

FIG. 6 shows the flush noise level in dBa as a function of time in a conventional flush toilet system. As mentioned, the ordinate shows adjusted decibels. The abscissa is divided in seconds. When the suction valve 7 is switched on, the noise peak 16 is developed, which is then amplified by the funnel function of the toilet bowl as indicated by the peak section 15 of the conventional noise curve. The continued operation of the suction valve 7 for up to five seconds results in a substantial noise up to about one-hundred-ten dBa.

Figure 7:
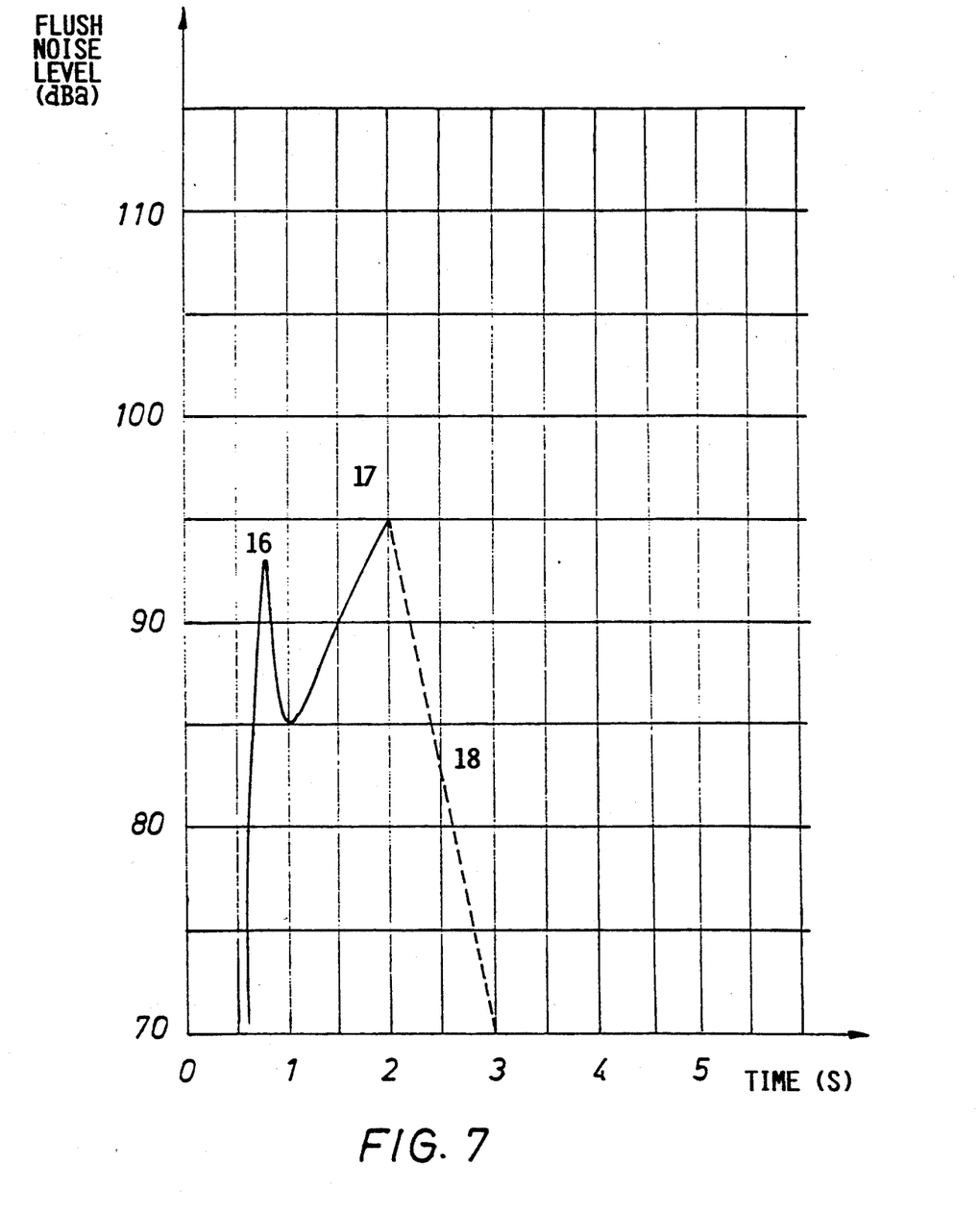
FIG. 7 also shows a noise level curve as a function of time for a toilet installation according to the invention.

FIG. 7 shows the noise curve 17 according to the invention. The initial peak 16 also develops. However, as shown by the legs 17 and 18 of the present curve, the effect of the invention is quite substantial. The maximum noise peak is only about ninety-five dBa and it takes place for a very short time duration. As soon as the valve 7 is closed, the noise goes down rapidly as shown by the leg 18.

Although the invention has been described with reference to specific example embodiments, it will be appreciated that it is intended to cover all modifications and equivalents within the scope of the appended claims.

What we claim is:

1. An apparatus for flushing a vacuum toilet, especially in an aircraft, comprising a toilet bowl installed on a floor in said aircraft, a waste collecting container, a conduit connecting said toilet bowl to said waste collecting container, a suction valve in said conduit near said toilet bowl, a flush water valve connecting to said toilet bowl, means for energizing said suction valve and said flush water for predetermined lengths of time, a by-ass flow valve (9) for supplying waste transporting air into said conduit downstream of said suction valve as viewed in the flow direction from said toilet bowl to said waste collection container, a coupling connecting said by-pass flow valve to said conduit, and means connecting said by-pass flow valve for a fixed length of time, wherein said energizing means comprise a control unit including a timer for first energizing said suction valve (7) for a first length of time of about one second and then energizing said by-pass flow valve (9) for a second length of time of about three seconds, said apparatus further comprising an air intake connected to said by-pass flow valve, said air intake comprising noise damping features for damping noise caused by air flowing through said air intake and a one-way flow device (10) connected in a pipe between said air intake and said by-pass flow valve, said one-way flow device permitting air flow from said air intake to said by-pass flow valve and preventing fluid flow from said by-pass flow valve to said air intake.

2. The apparatus of claim 1, wherein said air intake (11) is arranged at a level above a liquid level causing a liquid back flow through said air intake.

3. The apparatus of claim 1, wherein said air intake (11) is mounted below said floor in said aircraft.

4. The apparatus of claim 1, wherein said air intake (11) is adapted to be mounted on said floor in said aircraft.

5. The apparatus of claim 1, wherein said by-pass flow valve (9) is mounted below said floor in said aircraft.

6. The apparatus of claim 1, wherein said by-pass flow valve (9) is adapted to be mounted on said floor in said aircraft.

7. The apparatus of claim 1, wherein said coupling comprises a T-connector arranged in said conduit close to said waste collecting container.

8. The apparatus of claim 1, wherein said air intake is positioned above said floor in said aircraft.

9. The apparatus of claim 1, wherein said by-pass flow valve (9) is positioned above said floor in said aircraft.

10. An apparatus for flushing a vacuum toilet, especially in an aircraft, comprising a toilet bowl installed on a floor in said aircraft, a waste collecting container, a conduit connecting said toilet bowl to said waste collecting container, a suction valve in said conduit near said toilet bowl, a flush water valve connected to said toilet bowl, means for energizing said suction valve and said flush water for predetermined lengths of time, a by-ass flow valve (9) for supplying waste transporting air into said conduit downstream of said suction valve as viewed in the flow direction from said toilet bowl to said waste collection container, a coupling connecting said by-pass flow valve to said conduit, and means connecting said by-pass flow valve for a fixed length of time, wherein said energizing means comprise a control unit including a timer for first energizing said suction valve (7) for a first length of time of about one second and then energizing said by-pass flow valve (9) for a second length of time of about three seconds, said apparatus further comprising an air intake (11) connected to said by-pass flow valve, said air intake comprising noise damping features for damping noise caused by air flowing through said air intake and a one-way flow device (10) connected in a pipe between said air intake and said by-pass flow valve, said one-way flow device permitting air flow from said air intake to said by-pass flow valve and preventing fluid flow from said by-pass flow valve to said air intake, and wherein said air intake (11), said one-way flow device (10) and said by-pass flow valve (9) are all positioned below said floor in said aircraft.

* * * * *

UNITED STATES PATENT AND TRADEMARK OFFICE
CERTIFICATE OF CORRECTION

PATENT NO. : 5,317,763
DATED : June 7, 1994
INVENTOR(S) : Helge Frank, Christian Sparr It is certified that error appears in the above-identified patent and that said Letters Patent is hereby corrected as shown below:

Title page, line 2, under References Cited,
In [56] after "Rosenblatt" insert --et al.--.

Claim 1, col. 4, line 60, replace "connecting" by --connected--;
       col. 4, line 62, after "water" insert --valve--;
       col. 4, line 63, replace "by-ass" by --by-pass--;
       col. 4, line 68, after "valve" insert --to said energizing means for operating said by-pass flow valve--.

Claim 10, col. 6, line 11, after "water" insert --valve--;
       line 12, replace "by-ass" by --by-pass--;
       line 17, after "valve" insert --to said energizing means for operating said by-pass flow valve--.

Signed and Sealed this

Thirtieth Day of August, 1994

Attest:

BRUCE LEHMAN

Attesting Officer      Commissioner of Patents and Trademarks